M. L. WARNER.
PERCOLATOR.
APPLICATION FILED DEC. 13, 1921.
1,423,475.
Patented July 18, 1922.
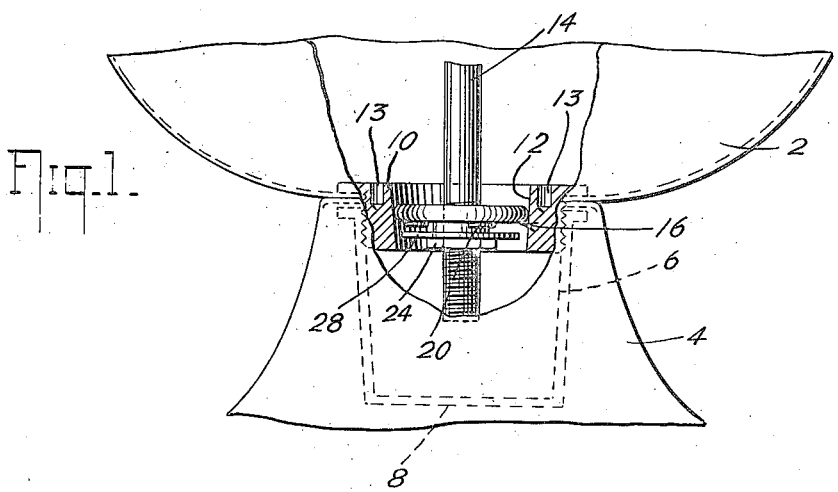
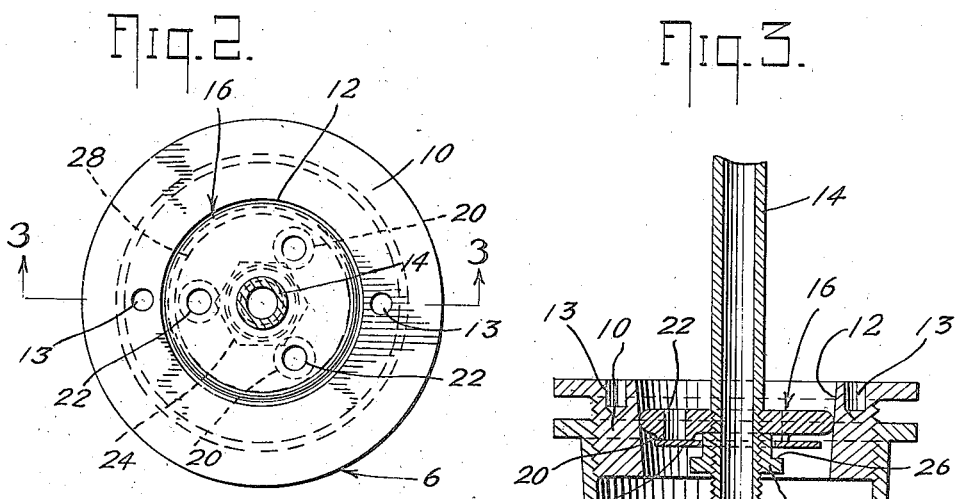
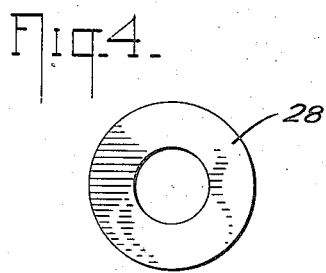
Inventor
MAURICE L. WARNER.
By his Attorneys

UNITED STATES PATENT OFFICE.

MAURICE L. WARNER, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATOR.

1,423,475.                Specification of Letters Patent.        Patented July 18, 1922.

Application filed December 13, 1921. Serial No. 521,971.

*To all whom it may concern:*

Be it known that I, MAURICE L. WARNER, a citizen of the United States, residing at Meriden, county of New Haven, State of Connecticut, have invented a certain new and useful Improvement in Percolators, of which the following is a full, clear, and exact description.

The present invention relates to percolators and the like.

An object of the invention is to provide a novel and improved utensil of this character.

Another object of the invention is to provide a novel and improved percolator tube and seat for the heating chamber of a percolator.

The several features of the invention will be clearly understood from the following description and accompanying drawings, in which:—

Figure 1 is a front view, partly in section, of a portion of a percolator embodying the features of the invention in their preferred form;

Fig. 2 is a detailed plan view of the heating chamber of the percolator with the percolator tube shown in section, and passages leading into the heating chamber shown closed;

Fig. 3 is a sectional view taken on the line 3—3 of Fig. 2; and

Fig. 4 is a detailed plan view of the valve disc.

The percolator illustrated in the drawings is provided with a liquid container 2, a supporting base 4, and a heating chamber 6. The heating chamber comprises a downwardly cup-shaped member 8 having its upper end closed by a nut 10 screw-threaded therein and provided with a central opening 12 and spanner wrench holes 13. The parts above described may be and preferably are the same as the corresponding parts of the percolator illustrated and described in my co-pending application filed of even date herewith.

The illustrated percolator is provided with a percolator tube 14 having an enlarged portion 16 mounted in the opening 12. The enlarged portion 16 in the form shown constitutes the valve body of a valve of the clapper valve type. The valve body is in the form of a disc having its peripheral surface rounded over vertically and resting upon the wall of the opening 12, which wall tapers downwardly slightly. The valve body or disc 16 is screw-threaded on the tube and is provided with three bosses 20 on the under side thereof and equally spaced about the percolator tube 14. The disc is provided with openings 22 that extend centrally through the bosses 20. A nut 24 is screw-threaded on the lower end of the tube 14 beneath the disc 16 and the nut has its upper portion reduced in diameter to provide a shoulder 26 on which a clapper valve disc 28 normally rests, the clapper valve disc being loosely mounted on the reduced portion of the nut.

It has been customary heretofore to make the valve body in the form of a hollow closed casing having a tapered wall adapted to closely fit the opening in the receptacle and having tubes soldered therein and extending longitudinally through the casing to form the valve openings, the percolator tube extending centrally through the casing. It was considered necessary to have the valve body of this hollow construction in order to obviate cooling effects of the contents of the liquid container upon the contents of the heating chamber. Such prior construction, however, has been found to be objectionable because of the danger of injury to the soldered joints between the component parts thereof in case at any time there should not be a sufficient amount of liquid in the percolator to prevent the valve body from becoming overheated.

It will be apparent that in the present construction the universal joint connection between the percolator tube and heating chamber enables the percolator tube to be freely tipped in any direction with relation to its seat, so that the tube and valve may be easily worked out of the opening in the heating chamber.

It will also be apparent that the solid disc construction of the illustrated valve body obviates any danger of injury thereto upon depletion of the liquid contents of the percolator. The valve body is made of an alloy of low heat conductivity, and is of sufficient thickness to protect the contents of the heating chamber from the cooling action of the liquid in the container. The bosses 20 on the under side of the valve body form suitable valve seats which space the clapper valve disc 28 away from the remainder of the under side of the valve body, so as to permit it to drop freely to open the valve upon the pressure being relieved in the heating chamber. The screw-threaded connection between the percolator tube and valve enables the tube to be adjusted toward and from the bottom of the liquid receptacle so as to vary as desired the minimum amount of liquid maintained in the receptacle during the operation of the percolator. The nut 24 not only acts to hold the disc 28 but also as a lock-nut for the disc 16.

While the enlarged portion 16 of the percolator tube in the illustrated construction in addition to serving as a base or support for the tube constitutes a valve body it is to be understood that, except as defined in the claims, certain features of the invention are not limited to a construction in which a valve is employed for regulating or restricting the passage of liquid from the liquid container to the heating chamber as obviously well known means other than a valve may be employed for this purpose.

What I claim is:

1. A percolator having, in combination, a heating chamber having an opening in its upper end, and a percolator tube provided with an enlarged portion having a rounded edge engaging the wall of said opening so as to permit tipping movement of the tube with relation to the heating chamber.

2. A percolator having, in combination, a heating chamber having an opening in its upper end, a percolator tube extending through said opening, and a universal joint connection between the tube and chamber so as to permit tipping movement of the tube with relation to the chamber.

3. A percolator having, in combination, a heating chamber having a seat in its upper end tapering downwardly, and a percolator tube having an enlarged portion arranged within the seat with the exterior edge of the enlarged portion rounded over and engaging the wall of the tapering seat to permit tipping movement of the tube with relation to the seat.

4. A percolator having, in combination, a heating chamber having an opening in its upper end tapering downwardly, a tube extending through the opening, a valve body comprising a solid disc screw-threaded on the tube having its peripheral surface rounded over vertically and fitting the wall of the opening and having a plurality of bosses on its under side with valve openings extending through the bosses, the bosses forming valve seats, a nut screw-threaded on the tube beneath said disc having an upwardly extending reduced portion, and a clapper valve disc loosely mounted on said reduced portion of the nut.

5. A percolator having, in combination, a heating chamber having an opening in its upper end, a percolator tube extending through the opening and a member mounted on the tube engaging the wall of the opening, said tube and member having provision for relative adjustment longitudinally of the tube.

6. A percolator having, in combination, a heating chamber having an opening in its upper end, a percolator tube and valve mounted in the opening, said valve comprising a solid valve body having a plurality of bosses on its under side arranged about the tube with valve openings extending through the bosses, the bosses forming valve seats, and a clapper valve disc surrounding the tube and capable of being moved upwardly to close said valve openings.

7. A percolator having, in combination, a liquid receptacle having an opening in its upper end tapering downwardly, a tube extending through the opening, a valve body consisting of a solid disc mounted on the tube having a valve opening and having its peripheral wall rounded over and engaging the wall of said opening in the receptacle, and means mounted on the tube for opening and closing said valve opening.

MAURICE L. WARNER.